(12) United States Patent
Maas

(10) Patent No.: US 9,516,797 B2
(45) Date of Patent: *Dec. 13, 2016

(54) SYSTEMS AND METHODS FOR TREATING A GROUND SURFACE

(71) Applicant: PlanetAir Turf Products, LLC, Owatonna, MN (US)

(72) Inventor: David R. Maas, Owatonna, MN (US)

(73) Assignee: PlanetAir Turf Products, LLC, Owatonna, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/618,312

(22) Filed: Feb. 10, 2015

(65) Prior Publication Data

US 2015/0150183 A1 Jun. 4, 2015

Related U.S. Application Data

(63) Continuation of application No. 13/812,372, filed as application No. PCT/US2010/043237 on Jul. 26, 2010, now Pat. No. 8,979,438.

(51) Int. Cl.
*E02D 3/026* (2006.01)
*A01B 29/02* (2006.01)
*A01B 45/02* (2006.01)

(52) U.S. Cl.
CPC ............. *A01B 29/02* (2013.01); *A01B 45/026* (2013.01); *E02D 3/026* (2013.01)

(58) Field of Classification Search
CPC ..... A01B 45/02; A01B 45/023; A01B 45/026; F16C 1/00
USPC .. 405/258.1, 271, 303; 172/21, 22; 404/122, 404/126, 132, 133.05, 133.1, 133.2
See application file for complete search history.

(56) References Cited

U.S. PATENT DOCUMENTS

| | | |
|---|---|---|
| 502,301 A | 8/1893 | Kime |
| 1,362,409 A | 12/1920 | Forker |
| 1,704,986 A | 3/1929 | Marcy |
| 1,955,937 A | 4/1934 | Allen |
| 1,965,510 A | 7/1934 | Porter |
| 2,041,208 A | 5/1936 | Rienks |
| 2,111,478 A | 3/1938 | McGuire |
| 2,302,944 A | 11/1942 | Helbig |
| 2,347,748 A | 5/1944 | Melling |
| 2,591,572 A | 4/1952 | Mascaro |
| 2,700,926 A | 2/1955 | Goit |
| 2,778,291 A | 1/1957 | Kerns |
| 3,143,090 A | 8/1964 | Cecil et al. |
| 3,148,737 A | 9/1964 | Lunsford |
| 3,393,751 A | 7/1968 | Mascaro |
| 3,522,965 A | 8/1970 | Indzeoski |
| 3,534,818 A | 10/1970 | Mascaro |
| 3,586,109 A | 6/1971 | Eversole et al. |
| 3,650,331 A | 3/1972 | Dedoes |
| 3,707,132 A | 12/1972 | Hansen |

(Continued)

OTHER PUBLICATIONS

International Search Report and Written Opinion in International Application No. PCT/US2010/043237, mailed Apr. 21, 2011, 8 pages.

(Continued)

*Primary Examiner* — Tara M. Pinnock
(74) *Attorney, Agent, or Firm* — Fish & Richardson P.C.

(57) ABSTRACT

Some embodiments of a ground surface treatment system can include a flexible roller system having one or more of rollers arranged in a side-by-side position and include a flexible axle member extending through each row of rollers.

12 Claims, 12 Drawing Sheets

(56) References Cited

U.S. PATENT DOCUMENTS

| | | |
|---|---|---|
| 3,797,577 A | 3/1974 | Killion et al. |
| 3,877,401 A | 4/1975 | Gutman |
| 3,939,917 A | 2/1976 | Reed, Jr. et al. |
| 3,993,143 A | 11/1976 | Moreland, Jr. |
| 4,020,907 A | 5/1977 | Luck |
| 4,081,034 A | 3/1978 | Hines |
| 4,084,642 A | 4/1978 | Killion |
| 4,148,362 A | 4/1979 | Orth |
| 4,154,305 A | 5/1979 | Prewett |
| 4,158,391 A | 6/1979 | Clements |
| 4,192,387 A | 3/1980 | Stinson |
| 4,212,357 A | 7/1980 | Clements et al. |
| RE30,705 E | 8/1981 | Hines |
| 4,326,591 A | 4/1982 | Dedoes |
| 4,336,760 A | 6/1982 | Cohen et al. |
| 4,383,580 A | 5/1983 | Huxford |
| 4,489,787 A | 12/1984 | Gary |
| 4,538,689 A | 9/1985 | Dietrich, Sr. |
| 4,550,783 A | 11/1985 | Hansen |
| 4,619,329 A | 10/1986 | Gorbett |
| 4,632,189 A | 12/1986 | Rizzo |
| 4,662,456 A | 5/1987 | Classen |
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,791,995 A | 12/1988 | Hochlan, Jr. |
| 4,840,232 A | 6/1989 | Mayer |
| 4,867,244 A | 9/1989 | Cozine et al. |
| 4,881,602 A | 11/1989 | Hansen et al. |
| 4,899,828 A | 2/1990 | Harris |
| 4,910,948 A | 3/1990 | Nelson |
| 4,924,944 A | 5/1990 | Cozine et al. |
| 5,014,791 A | 5/1991 | Kure |
| 5,020,602 A | 6/1991 | Dellinger |
| 5,029,652 A | 7/1991 | Whitfield |
| 5,036,651 A | 8/1991 | Nelson |
| 5,036,655 A | 8/1991 | Holloway |
| 5,069,293 A | 12/1991 | St. Romain |
| 5,101,910 A | 4/1992 | Dawson |
| 5,119,880 A | 6/1992 | Zehrung, Jr. et al. |
| 5,142,852 A | 9/1992 | Nelson |
| 5,152,348 A | 10/1992 | Flanagan, Sr. et al. |
| 5,172,768 A | 12/1992 | Straus |
| 5,183,120 A | 2/1993 | Watanabe |
| 5,207,278 A | 5/1993 | Hatlen |
| 5,209,306 A | 5/1993 | Whitfield |
| 5,398,767 A | 3/1995 | Warke |
| 5,398,768 A | 3/1995 | Staples |
| 5,460,229 A | 10/1995 | Mattis |
| 5,469,922 A | 11/1995 | Bjorge |
| 5,495,895 A | 3/1996 | Sakamoto |
| 5,570,746 A | 11/1996 | Jones et al. |
| 5,579,847 A | 12/1996 | Postema |
| 5,586,603 A | 12/1996 | Mattis |
| 5,586,604 A | 12/1996 | Postema |
| 5,615,744 A | 4/1997 | Krafka |
| 5,623,996 A | 4/1997 | Postema |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,709,273 A | 1/1998 | Roth |
| 5,765,645 A | 6/1998 | Postema |
| 5,769,169 A | 6/1998 | Miksitz |
| 5,803,181 A | 9/1998 | Hsu |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 5,937,953 A | 8/1999 | Melberg et al. |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,086,520 A | 7/2000 | Rodriquez |
| 6,102,129 A | 8/2000 | Classen |
| 6,179,061 B1 | 1/2001 | Fiore |
| 6,241,025 B1 | 6/2001 | Myers et al. |
| 6,273,197 B1 | 8/2001 | Marlow |
| 6,321,849 B1 | 11/2001 | Underhill |
| 6,415,872 B2 | 7/2002 | Myers et al. |
| 6,425,161 B1 | 7/2002 | LeMeur et al. |
| 6,484,811 B1 | 11/2002 | Edwards |
| 6,513,603 B2 | 2/2003 | Bjorge |
| 6,543,798 B2 | 4/2003 | Schaffner et al. |
| 6,659,190 B2 | 12/2003 | Jessen |
| 6,675,905 B2 | 1/2004 | Hill et al. |
| 6,684,960 B1 | 2/2004 | Ng et al. |
| 6,691,791 B2 | 2/2004 | Bjorge |
| 6,708,773 B1 | 3/2004 | Kinkead et al. |
| 6,758,283 B2 | 7/2004 | Lauer et al. |
| 6,792,704 B2 | 9/2004 | Johnson |
| 6,805,205 B1 | 10/2004 | Gabard |
| 6,983,806 B2 | 1/2006 | Bjorge |
| 7,055,617 B2 | 6/2006 | Bjorge et al. |
| 7,070,005 B2 | 7/2006 | Maas |
| 7,096,968 B2 | 8/2006 | Maas |
| 7,152,691 B2 | 12/2006 | Maas et al. |
| 7,204,317 B2 | 4/2007 | Maas et al. |
| 7,290,619 B2 | 11/2007 | Maas et al. |
| 7,451,831 B2 | 11/2008 | Bjorge et al. |
| 2003/0015125 A1 | 1/2003 | Steadman |
| 2003/0230417 A1 | 12/2003 | Maas et al. |
| 2005/0147470 A1 | 7/2005 | Fimbinger |
| 2006/0037762 A1 | 2/2006 | Maas |
| 2006/0225899 A1 | 10/2006 | Maas et al. |
| 2008/0053350 A1 | 3/2008 | Jones et al. |

OTHER PUBLICATIONS

International Preliminary Report on Patentability in International Application No. PCT/US2010/043237, issued Jan. 29, 2013, 5 pages.

PlanetAir Aerator, "Aerate, Mow, then Putt in just 15 minutes . . . ", Brochure, PlanetAir Turf Products, LLC—believed to have been publicly available before Aug. 11, 2003.

PlanetAir Aerator, "Aerate. Mow. Play.: Breaking New Ground in Turf Maintenance Technology," Brochure, PlanetAir Turf Products, LLC—believed to have been publicly available before Aug. 11, 2003, 8 pages.

PlanetAir Aerator, "Innovation that improves and protects your piece of the planet . . . ," Brochure, PlanetAir Turf Products, LLC—believed to have been publicly available before Aug. 11, 2003.

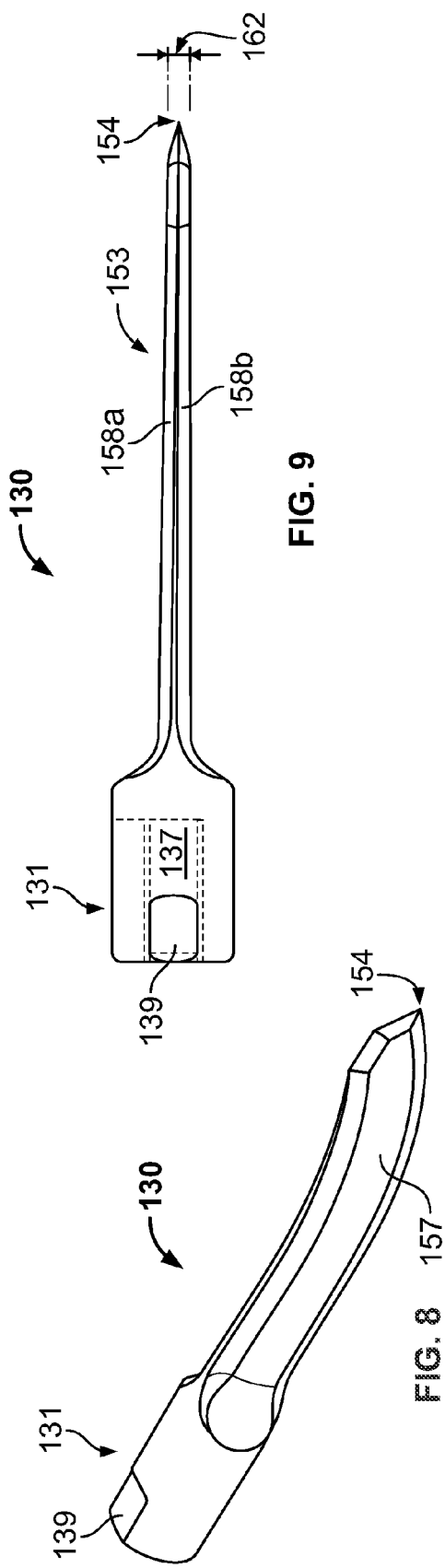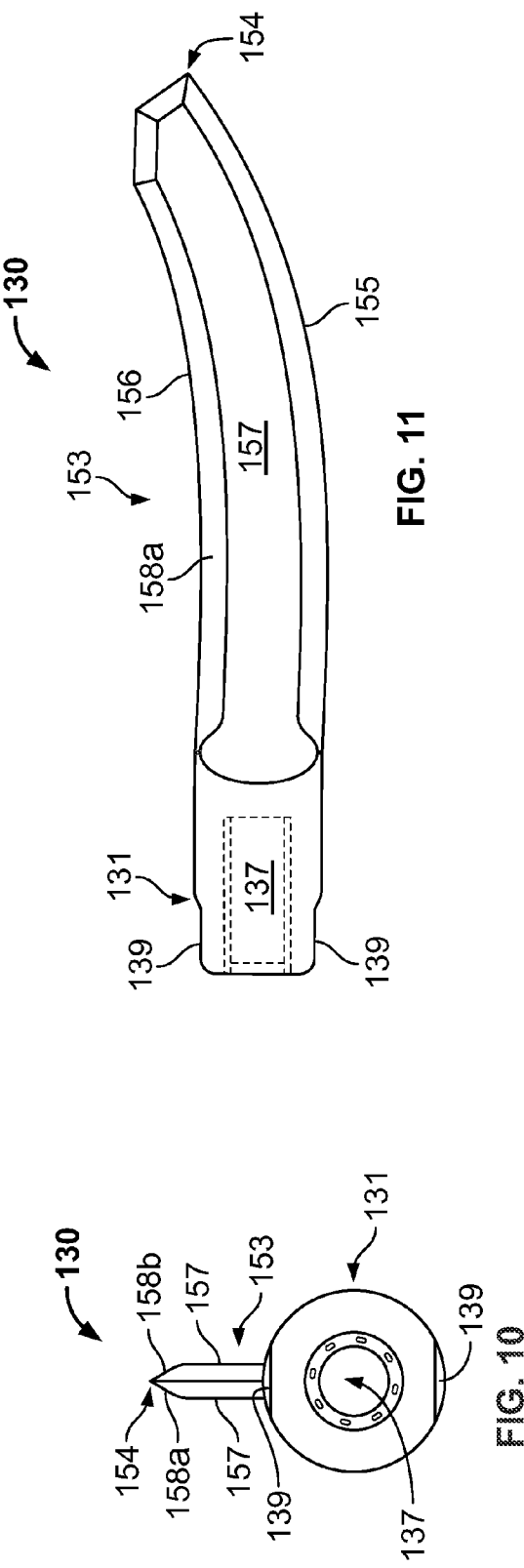

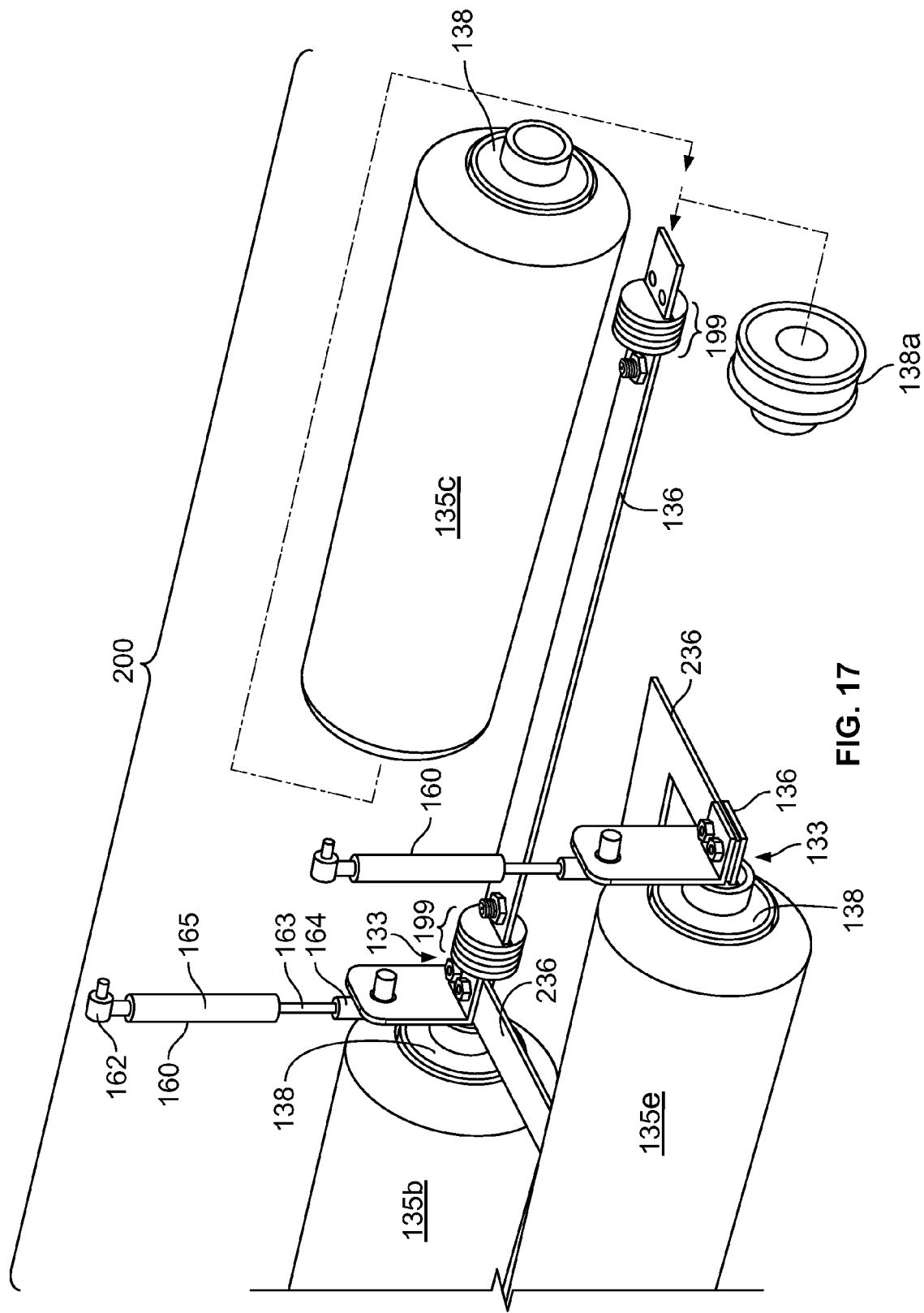

SYSTEMS AND METHODS FOR TREATING A GROUND SURFACE

CROSS-REFERENCE TO RELATED APPLICATION

This application is a continuation of U.S. application Ser. No. 13/812,372, filed Apr. 3, 2013, which is a National Stage Application under 35 U.S.C. §371 and claims the benefit of International Application No. PCT/US2010/043237, filed Jul. 26, 2010. The disclosure of the foregoing application is hereby incorporated by reference in its entirety.

TECHNICAL FIELD

This document relates to treating a ground surface, such as a system for aerating a ground surface and rolling over the treated ground surface.

BACKGROUND

Soil aeration is a conventional technique used by groundskeepers to reduce compaction in the ground soil, stimulate plant growth, and promote proper drainage. Soil may become compacted from overuse or environmental effects, which ultimately affects the soil permeability and development of rooted plants within the soil. In particular, compacted soil restricts the amount of oxygen that can enter the soil and the amount of carbon dioxide that can escape. Not all soils are affected equally by overuse and environmental factors. The amount of compaction depends on soil composition, the amount of vegetation, and the moisture content of the soil. Periodic soil aeration relieves the compaction in the soil before the negative effects overburden the soil to the point that it can no longer support desirable vegetation.

Some conventional soil aerators penetrate the ground using coring tubes that penetrate the ground and remove "plugs" of soil. When the plugs of soil are removed from the ground, the treated ground surface is littered with the soil plugs, and each newly formed pocket may be surrounded by dented or elevated regions of turf.

In more recent aeration systems, a soil aeration apparatus may include a set of aeration blades that cut the soil in a planetary motion so as to form the aeration pockets. In these cases, there are no plugs of soil that are removed from the ground and littered across the ground surface. However, on some ground surfaces (e.g., putting greens or the like), some of the aeration blades may create a small upward lip or elevated region of turf during the formation of the aeration pockets.

SUMMARY

Some embodiments of a ground surface treatment system can include a flexible roller system having one or more of rollers arranged in a side-by-side position and include a flexible axle member extending through each row of rollers. In such circumstances, the flexible roller system can be configured to provide a smoothing effect along a ground surface even when the ground surface includes significant undulations (e.g., an undulating putting green surface). In particular embodiments, one or more rollers in the flexible roller system can be automatically adjusted to different orientations as the flexible roller systems rolls over an undulating ground surface, thereby enhancing the ability of the roller system to more closely match the contour of the terrain. Such embodiments may be useful in circumstances when the ground surface has been treated with an aeration apparatus that may create a need for the ground surface to be smoothed by the flexible roller system.

Some embodiments described herein include a system for treating a ground surface. The system may include a frame for transporting over a ground surface, and an aeration apparatus coupled to the frame. The aeration apparatus may include a plurality of aeration tines that form aeration pockets in the ground surface when driven to penetrate the ground surface. The system may further include a flexible roller system coupled to the frame. The flexible roller system may include a plurality of rollers arranged in side-by-side axial positions with each roller having a generally rigid cylindrical surface to contact the ground surface, and a flexible axle member extending through the plurality of rollers such that the flexible axle member flexes in response to the plurality of rollers contacting an undulating portion of the ground surface.

In particular embodiments, a system for treating a ground surface includes a frame for transporting over a ground surface, and a flexible roller system coupled to the frame. The flexible roller system may include a plurality of rollers arranged in side-by-side axial positions with each roller having a generally rigid cylindrical surface to contact the ground surface. The flexible roller system may also include an axle member extending through the plurality of rollers, and a plurality of constant force springs extending between the frame and the axle member so as to provide downward forces that urge the axle member toward the ground surface.

In some embodiments, a system for treating a ground surface may include a frame for transporting over a ground surface, and a soil treatment apparatus coupled to the frame such that the soil treatment apparatus penetrates the ground surface when the frame is transported over the ground surface. The system may also include a roller system coupled to the frame at a position rearward of the soil treatment apparatus. The roller system may include a plurality of rollers arranged in side-by-side axial positions with each roller having a generally rigid cylindrical surface to contact the ground surface. The roller system may further include a flexible axle member extending through the plurality of rollers such that the flexible axle member flexes in response to the plurality of rollers contacting an undulating portion of the ground surface. The roller system may also include a plurality of constant force springs extending between the frame and the flexible axle member so as to provide downward forces at regions between the rollers to deflect the flexible axle member toward the ground surface in response to the plurality of rollers contacting the undulating portion of the ground surface.

In other embodiments, a method for treating a ground surface may include transporting a frame for transporting over a ground surface, and contacting rollers of a flexible roller system to the ground surface, wherein the flexible roller system is coupled to the frame. The flexible roller system may include a plurality of rollers arranged in side-by-side axial positions with each roller having a generally rigid cylindrical surface to contact the ground surface. The flexible roller system may also include a flexible axle member extending through the plurality of rollers, and a plurality of constant force springs extending between the frame and the flexible axle member so as to provide downward forces that urge the flexible axle member toward the ground surface.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8 is a perspective view of an aeration tine.

FIG. 9 is a top view of the aeration tine of FIG. 8.

FIG. 10 is an end view of the aeration tine of FIG. 8.

FIG. 11 is a side view of the aeration tine of FIG. 8.

FIG. 17 is an exploded view of components of the flexible roller system.

Like reference symbols in the various drawings indicate like elements.

DETAILED DESCRIPTION OF ILLUSTRATIVE EMBODIMENTS

Figure 1:
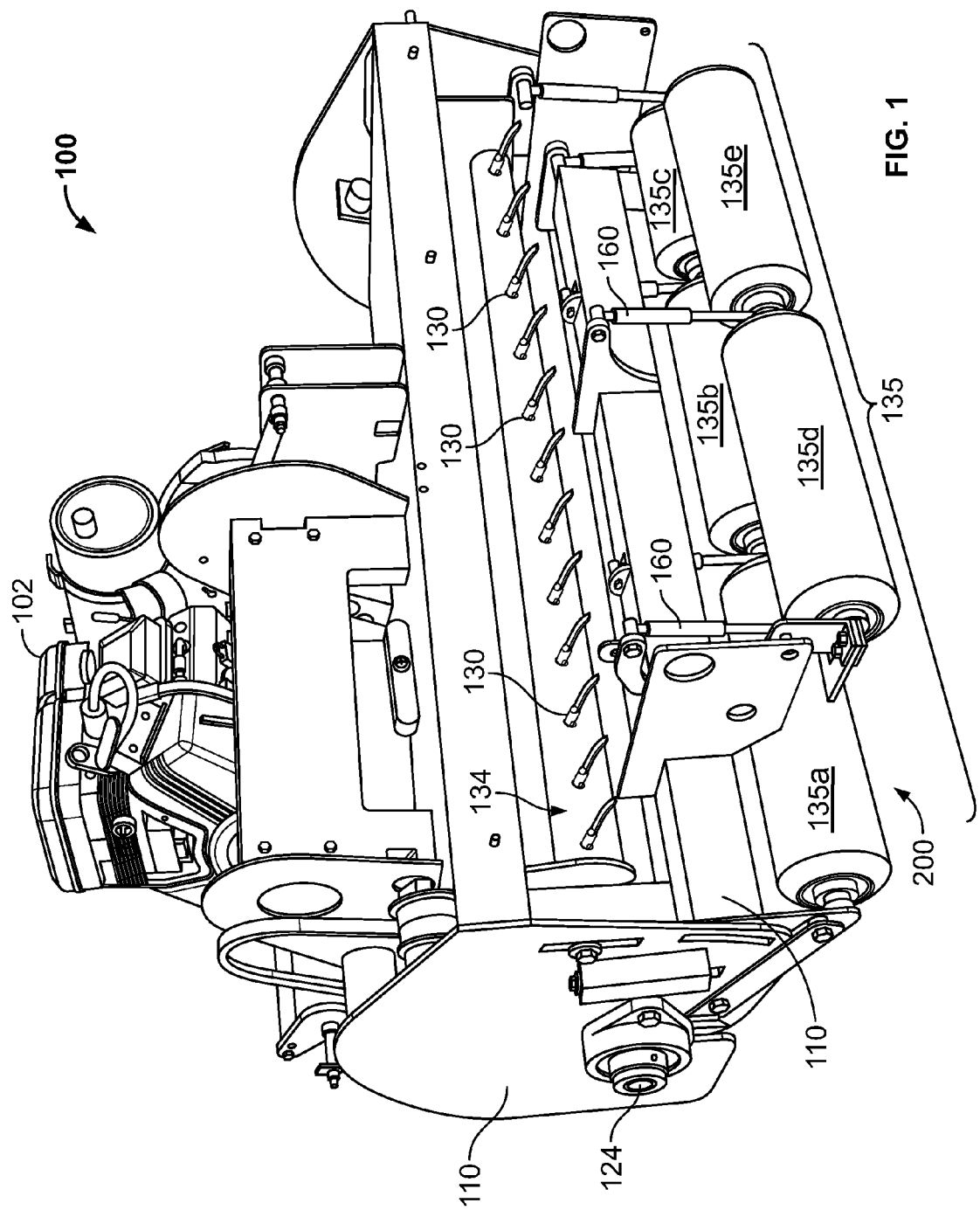
FIGS. 1-4 are perspective views of a ground treatment system that includes a flexible roller system.

Referring to FIGS. 1-4, some embodiments of a ground treatment system 100 may include a frame 110 with wheels 115 (for transporting over a ground surface) and a flexible roller system 200 coupled to the frame. As described in more detail below, the flexible roller system 200 can be coupled to the frame 110 in a manner that causes a plurality of rollers 135 to contact the ground surface and thereby provide a smoothing effect to the treated ground surface. In the depicted embodiment, the ground treatment system 100 is in the form of an aerator system having an aeration apparatus 120 equipped with a plurality of aeration tines 130 (mounted on a tine-holder shaft 134) that penetrate the ground surface to form aeration pockets. The flexible roller system 200 in this embodiment is arranged rearward of the aeration apparatus 120 such that the rollers 135 of the flexible roller system 200 contact and smooth the ground surface after it is treated by the plurality of aeration tines 130. Accordingly, the system 100 can provide aeration and smoothing in a single pass even in circumstances when the ground surface includes undulations, thereby treating the ground surface in a more efficient and economical manner.

Some embodiments of the aerator system 100 can include a drive source 102, such as a variable speed drive motor, that can drive the aeration apparatus 120 (via a gear system) to move in a planetary motion and thereby form aeration pockets in the ground using aeration tines 130. The drive source 102 in this embodiment is mounted to the top of the frame 110. During operation of the aerator system 100, the variable speed drive motor 102 can operate continuously while the frame 110 is transported over a ground surface (e.g., a golf fairway, a putting green, or another ground surface to be treated) that is being aerated by the aeration apparatus 120. When the aerator system 100 is transported across a surface that is not to be aerated (e.g., a paved sidewalk, path, or driveway), the entire aerator system 100 can tilt to rest entirely on the wheels 115, as will be described in detail below. (It should be understood that the wheels 115 are removed from view in FIG. 1 in order to clearly show an arrangement of individual rollers 135 in the flexible roller system 200.) Each wheel 115 can be coupled to an axle 146 that is in turn coupled to the frame 110. The left and right wheels 115 are axially aligned with one another, and can be positioned rearward of the rollers 135 and the aeration apparition 120. Some embodiments of the aerator system 100 include a front roller 103 (FIG. 4) that can serve, for example, like a front wheel and bear a portion of the weight of the system 100 during operation.

Referring now to FIG. 1 in more detail, some embodiments of the plurality rollers 135 of the flexible roller system 200 include a first row of three rollers 135a-c and a second row of two rollers 135d-e. The first row of rollers 135a-c are axially aligned and positioned forward of the second row rollers 135d-e, meaning that, during operation of the flexible roller system 200, the first row of rollers 135a-c roll over the treated ground surface before the second row of rollers 135d-e. This embodiment of the flexible roller system 200 includes five rollers 135, but other embodiments can include two or more rollers arranged in various positions relative to one another. The plurality of rollers 135 can be advantageously positioned such that subsequent rows of rollers 135d-e roll over gaps between rollers 135a-c of preceding rows. For example, referring to FIG. 1, the roller 135d is positioned to roll across the gap between rollers 135a and 135b, thus able to provide a smoothing effect to gap areas of the ground surface that rollers 135a-b may have missed not contacted.

Figure 13:
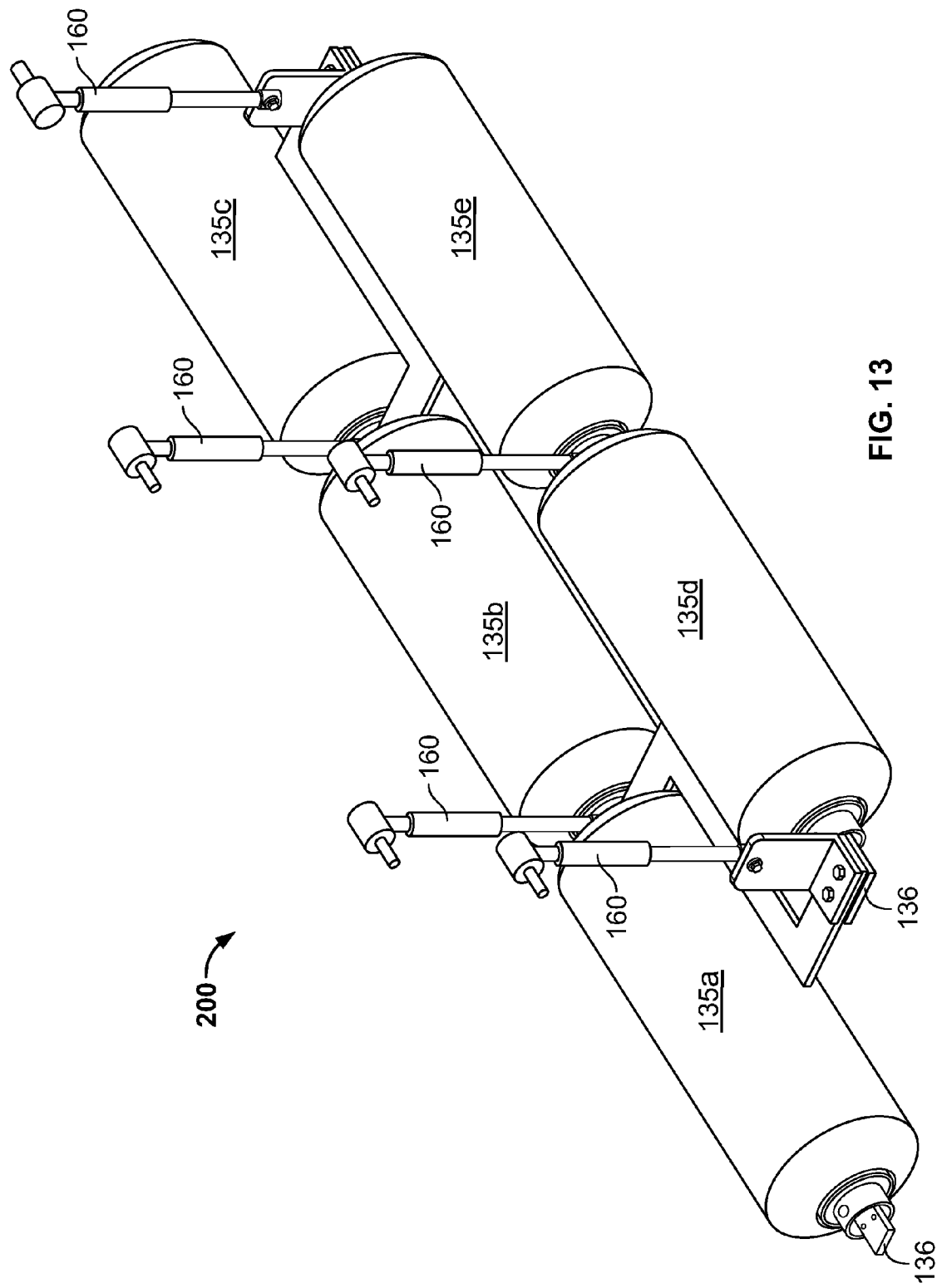
FIG. 13 is a perspective view of the flexible roller system.
Figure 14:
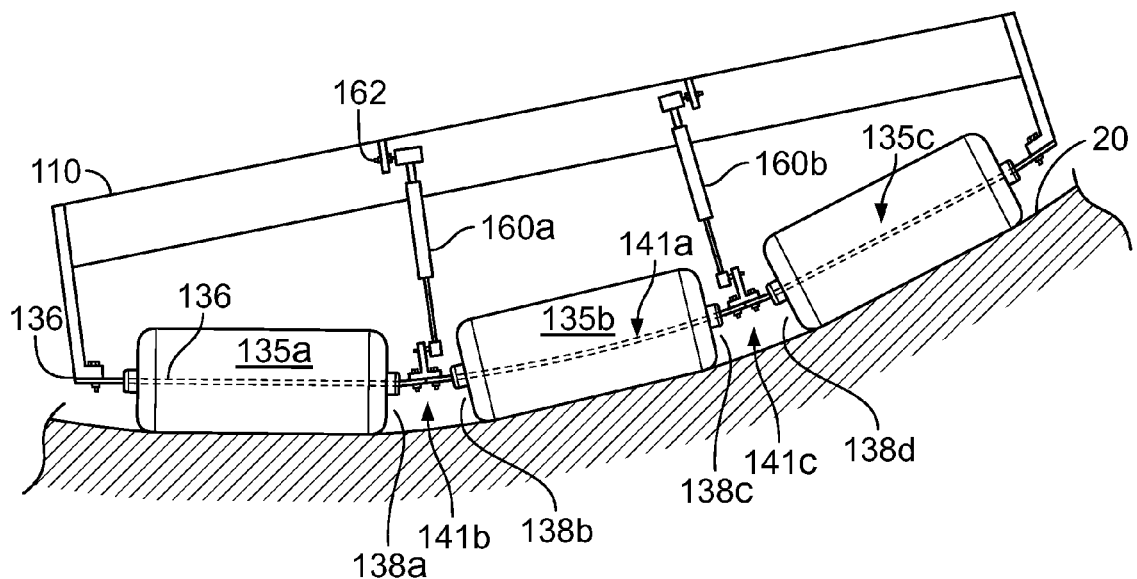
FIG. 14 is a view of the flexible roller system in operation over an undulating portion of a ground surface.

In operation, the flexible roller system 200 can include a flexible axle member 136 (FIGS. 13-14) extending through each row of rollers 135 such that the flexible roller system 200 has the capability to provide a smoothing effect over an undulating ground surface (e.g., an undulating putting green), described in connection with FIGS. 13-14 below. For example, each of the rollers 135 in the flexible roller system 200 can be automatically adjusted to different orientations as the flexible roller systems rolls over an undulating ground surface, thereby enhancing the ability of the roller system 200 to more closely match the curvature of the terrain over which the flexible roller system 200 is rolling. As described in more detail below, some embodiments of the flexible roller system 200 can accomplish the aforementioned benefits by employing the flexible axle members 136 that are coupled to constant force springs 160 (FIGS. 13-14).

The size of the rollers 135 in the flexible roller system 200 can vary in different embodiments. For example, while each roller 135 depicted in FIG. 1 can be about 20 inches long and about 5 inches in diameter, other lengths and diameters can be used. A roller length of about 20 inches may be selected, for example, as it may be determined that a roller 135 having a 20-inch length is generally effective to maintain smoothing contact with the ground surface even when encountering slope undulations (e.g., a sloping and undulating putting green) on which the flexible roller system 200 is likely to be used. Advantages of having different sized rollers 135 will be discussed in more detail below.

During operation of the ground treatment system 100, a tractor or other tow vehicle can pull the ground treatment system 100 across a ground surface while the aeration apparatus 120, which is forward of the flexible roller system 200, aerates the soil. As the ground treatment system 100 continues forward, the flexible roller system 200 rolls over the just-aerated soil, providing a smoothing effect, such as generally flattening irregularities in the ground's surface caused by the aeration apparatus 120. Moreover, the flexible roller system 200 is configured to flex according to the undulations of the ground surface to thereby provide an improved smoothing outcome that might otherwise be hindered by a single-roller system.

Figure 2:
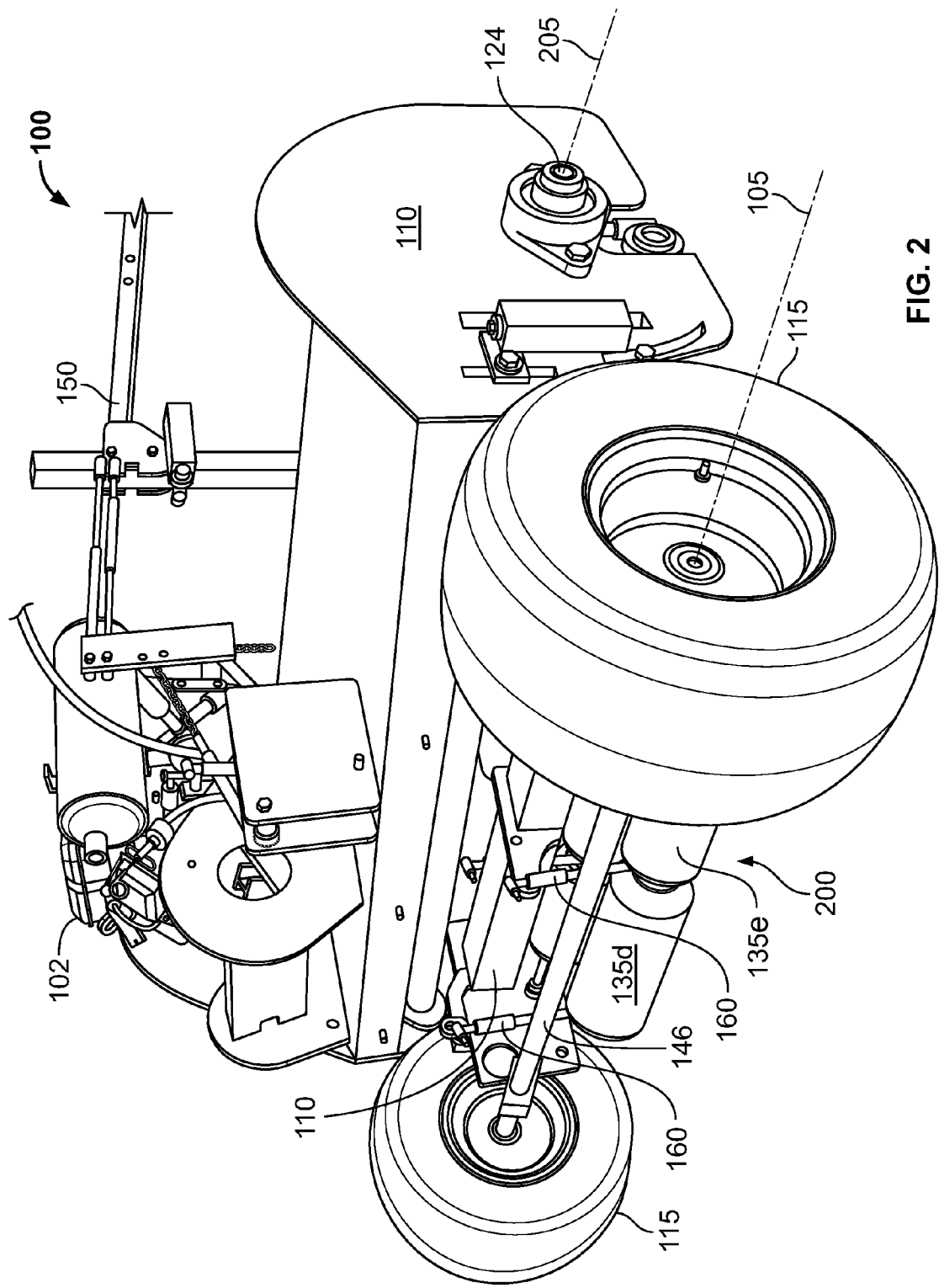
Figure 3:
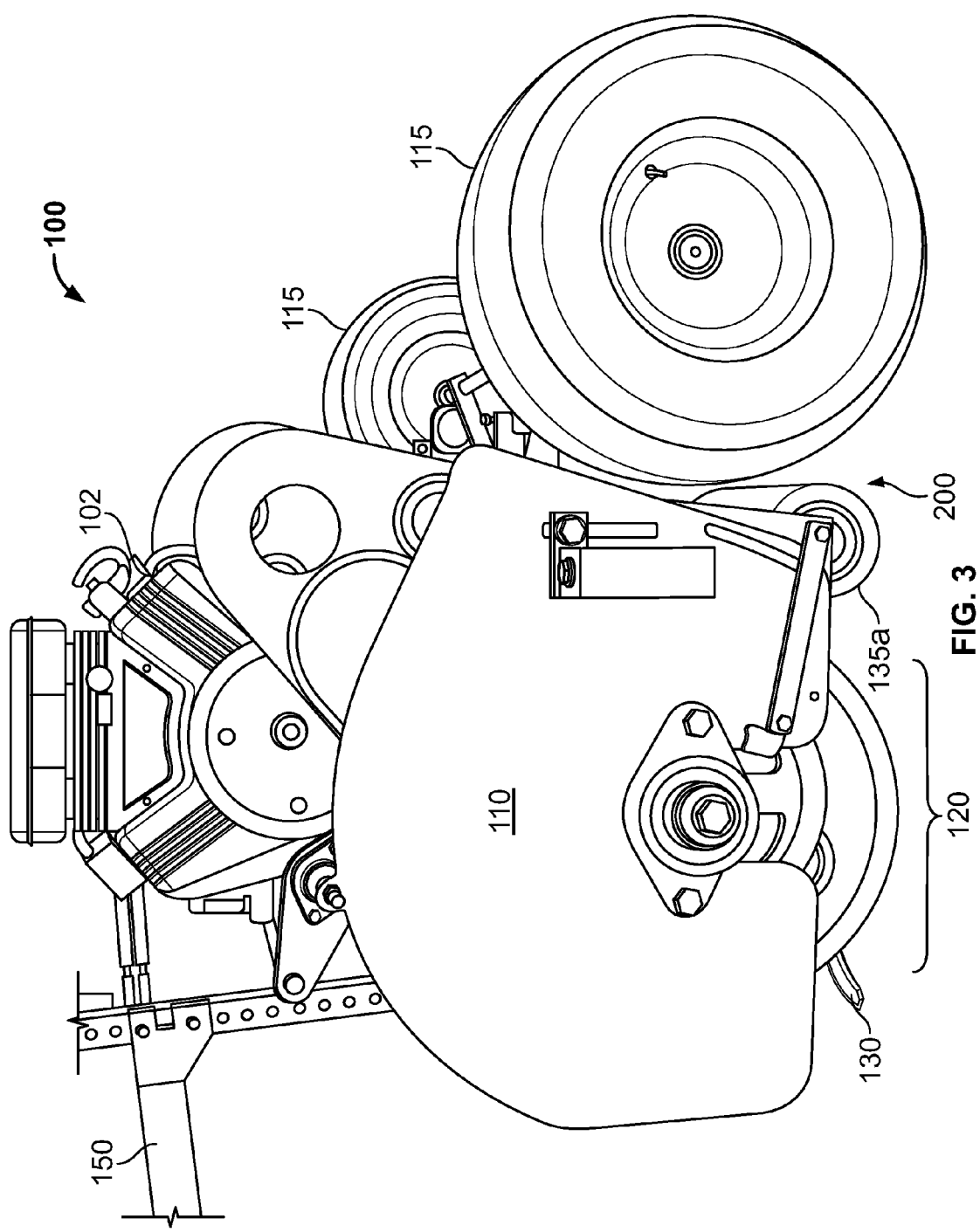
Figure 4:
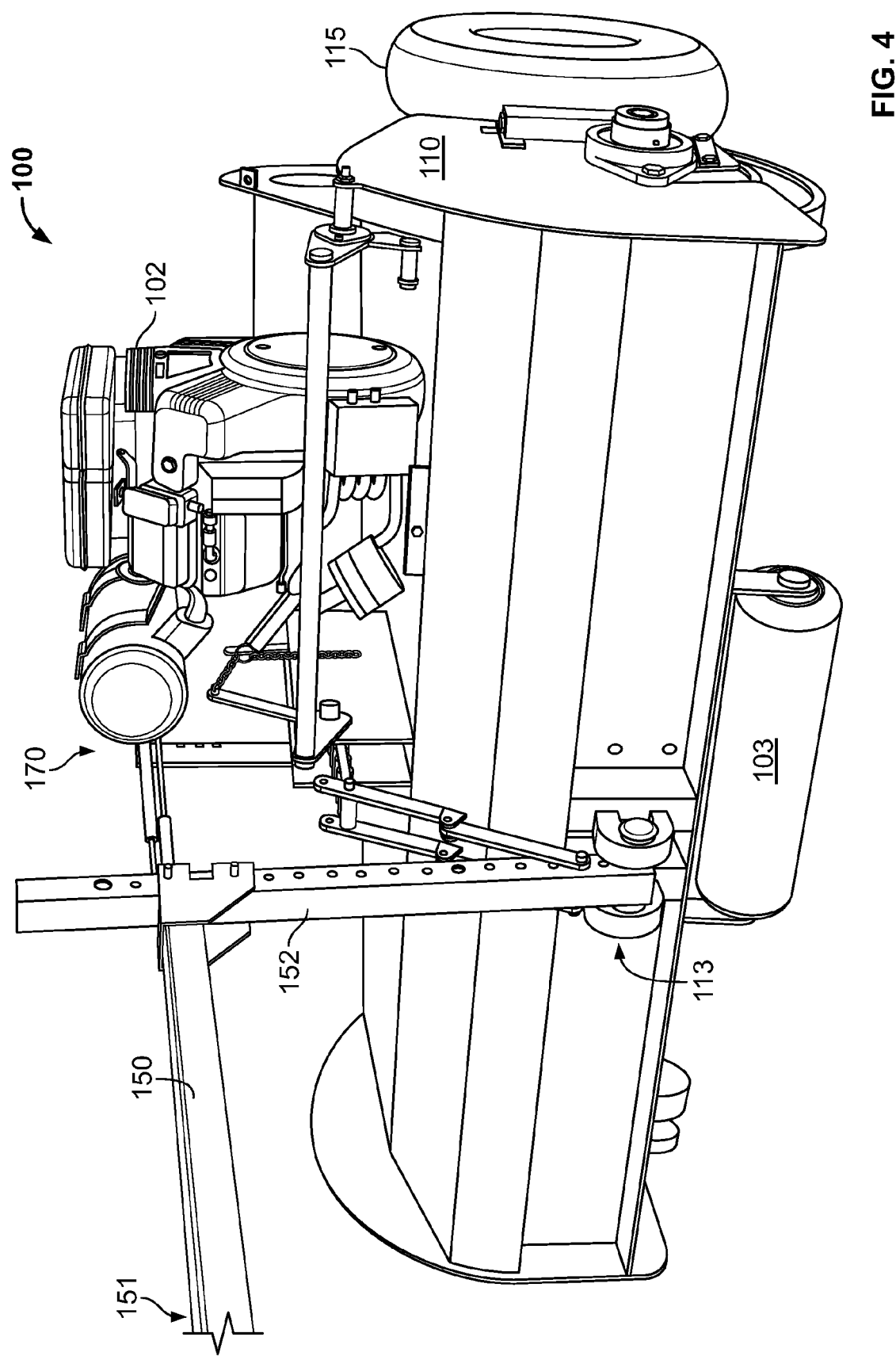

Referring to FIGS. 2-4 in more detail, a connection shaft 150 is coupled to the frame 110 and includes a receiving end 151 that is capable of interconnecting with a towing attachment device (e.g., a one-point hitch device or the like). In this embodiment, the aeration apparatus 120 is adapted for a one-point towable connection to a tractor or utility vehicle (not shown). For example, a tow-hitch device may be coupled to the receiving end 151 for connection to a complimentary ball-hitch device on a utility vehicle. Thus, the ground treatment system 100 may be towed behind the utility vehicle using a ball-hitch assembly to move the aeration apparatus 120 over the ground surface, followed by the flexible roller system 200. As shown in FIG. 4, the connection shaft 150 is rigidly connected to a vertical member 152, which is rotatably engaged with the front of the frame 110 at a pivot axis 113. As such, the frame 110 may pivot about the pivot axis 113 relative to the vertical member 152 and the connection shaft 150. The system may include a lifting device 170 that is coupled to the frame 110, such as a pneumatic or hydraulic cylinder, which can be actuated to lift the aeration apparatus 120 and flexible roller system 200 upward from the ground surface while the frame 110 is transported over a non-soil surface (e.g., a golf cart path, sidewalk, driveway, or the like).

Figure 5:
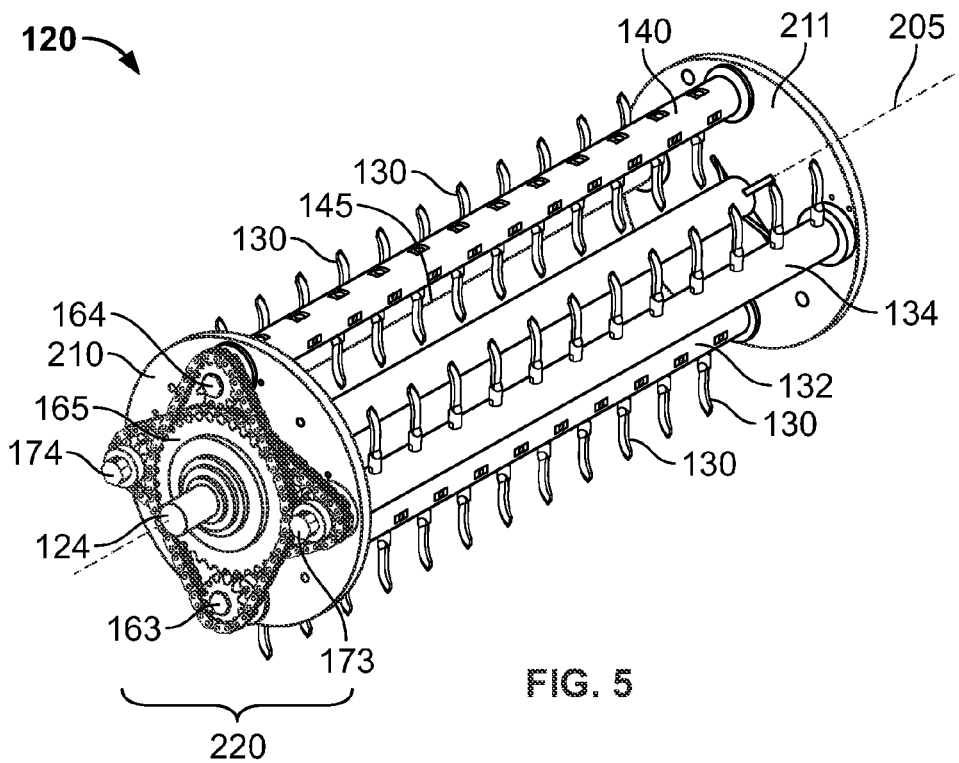
FIG. 5 is a perspective view of an aeration apparatus in accordance with an embodiment of the invention.

Referring to FIGS. 2 and 5, the aeration apparatus 120 is mounted to the frame 110 forward of the wheels 115 such that a central axis 205 of the aeration apparatus 120 is offset from and substantially parallel to a wheel axis 105. Additionally, when the flexible roller system 200 is in a non-flexed condition, the axes (refer to FIG. 1) along each row of rollers 135 are also generally parallel to the central axis 205 and wheel axis 105.

Figure 6:
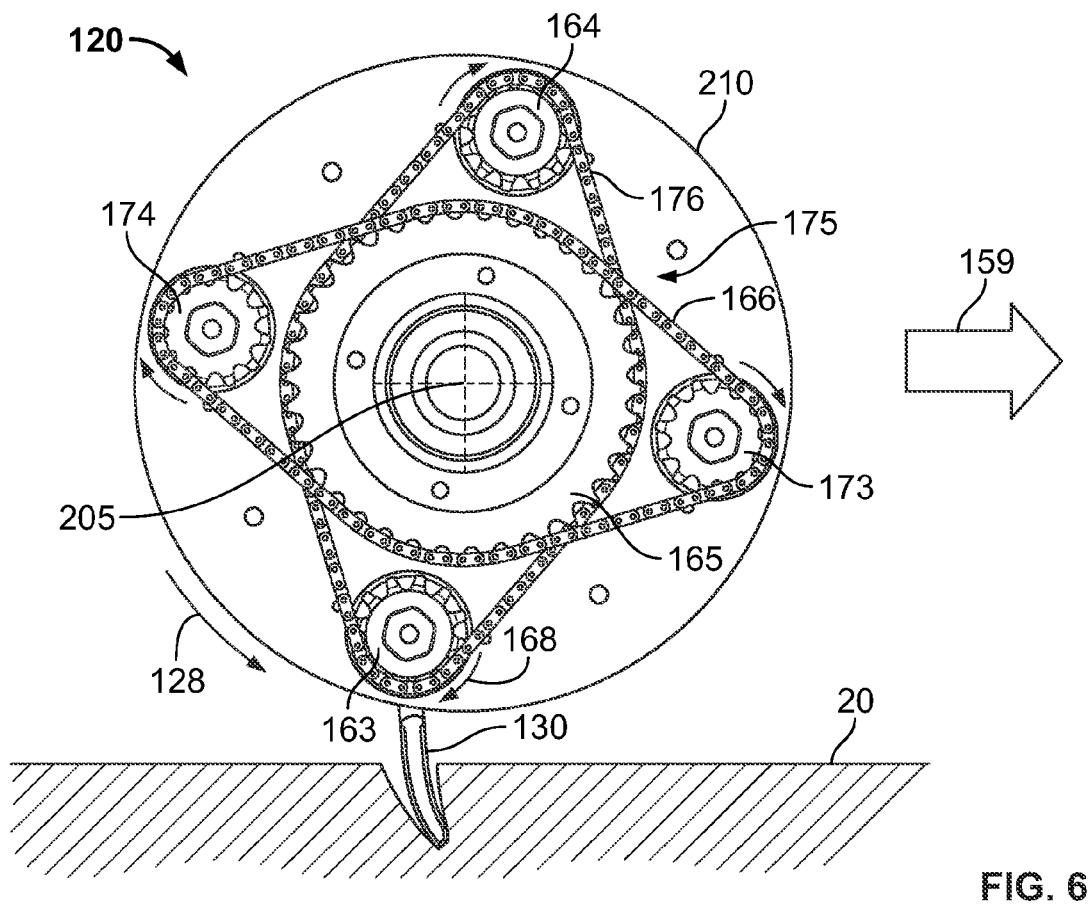
FIG. 6 is a side view of the aeration apparatus of FIG. 5.

Referring now to FIGS. 5 and 6, some embodiments of the aeration apparatus 120 can include a planetary gear system 220 on the outer side of one or both carriers 210 and 211. The planetary gear system 220 controls the timing and the movement of tine-holder shafts 132, 134, 140, and 145 as the aeration tines 130 penetrate the ground surface to form aeration pockets. Thus, as a tractor or utility vehicle tows the frame 110 over the ground surface, the frame 110 maintains proper height and attitude of the aeration apparatus 120 while the drive source 102 urges the rotation of the carriers 210 and 211 (and thus the planetary motion of the planetary gear system 220.

Referring to FIG. 5, a planetary gear system 220 includes a plurality of planetary gears 163, 164 (or 173, 174) for each sun gear 165 (or 175). The sun gears 165 and 175 are identical in size to each other, and operate in parallel planes (in FIG. 6, sun gear 175 is "behind" sun gear 165). In this embodiment, planetary gears 163 and 164 interact with sun gear 165. Planetary gear 163 is axially aligned with and fixedly mounted to a tine-holder shaft 132. Likewise, planetary gear 164 is axially aligned with and fixedly mounted to a tine-holder shaft 140. The sun gear 165 is axially aligned with the central axis 205 but remains substantially fixed with respect to the central axis 205 as the carriers 210 and 211 rotate about the central axis 205. A drive chain 166 is engaged with the sun gear 165 and the corresponding planetary gears 163 and 164, which causes the planetary gears 163 and 164 to rotate in the direction 168 as the planetary gears 163 and 164 revolve about the sun gear 165 in the direction 128. This rotational 168 and revolving 128 motion of the planetary gears 163 and 164 causes the tine-holder shafts 132 and 140 to move in a desired path for penetrating and removing portions soil from the ground surface.

At the same time, planetary gears 173 and 174 interact with sun gear 175 by way of a drive chain 176 in a manner similar to that of sun gear 165 and planetary gears 163 and 164. The interaction of planetary gears 173 and 174 with the sun gear 175 causes the tine-holder shafts 134 and 145 to have a rotational 168 and revolving 128 motions similar to that of tine-holder shafts 132 and 140. The planetary gear system 220 provides the desired motion of the tine-holder shafts 132, 134, 140, and 145 without using individual sun gear and planetary gear for each tine-holder shaft (e.g., four tine-holder shafts, four sun gears, and four planetary gears). Rather, the planetary gear system 220 operates a plurality of planetary gears from each sun gear, which advantageously reduces the bulkiness of the gear system of the aeration apparatus 120.

Briefly referring again to FIG. 5, the aeration apparatus 120 may include a support shaft 124 along the central axis 205. This support shaft 124 provides mechanical stability for the aeration apparatus 120 when in operation. Optionally, the aeration apparatus 120 may operate without a centrally-located support shaft 124. For example, the tine-holder shafts 132, 134, 140, and 145 may be rotatably mounted to the carriers 210 and 211 so as to provide sufficient mechanical stability for the aeration apparatus 120 without the need for the support shaft 124. In such a case, the tine-holder shafts 132, 134, 140, and 145 would also serve as non-centrally-located support shafts.

Referring to FIG. 6, one embodiment of the aeration apparatus 120 causes each tine-holder shaft 132, 134, 140, and 145 to rotate about its own central axis in a clockwise direction 168 as all of the tine-holder shafts 132, 134, 140, and 145 revolve about the central axis 205 in a counter-clockwise direction 128. In addition, the entire aeration apparatus 120 is transported over a ground surface 20 as a towing force 159 is applied to the frame 110. Example ground surfaces 20 include grassy or other areas of parks, golf courses (including fairways and putting greens), residential lots, and so on. The compound motion of the tine-holder shafts 132, 134, 140, and 145 (clockwise rotation combined with revolving motion about the central axis 205) causes the aeration tines 130 to penetrate the ground surface 20 and to subsequently form an aeration pocket in the soil.

Figure 7A:
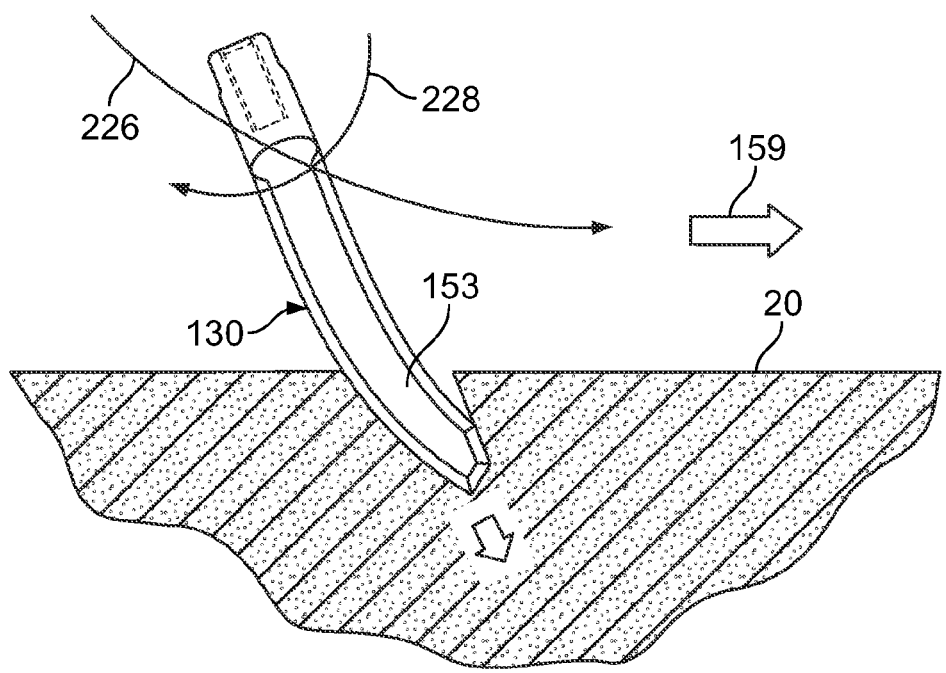
FIGS. 7A-B are side views of various positions of an aeration tine during operation of the aeration apparatus of FIG. 6.
Figure 7B:
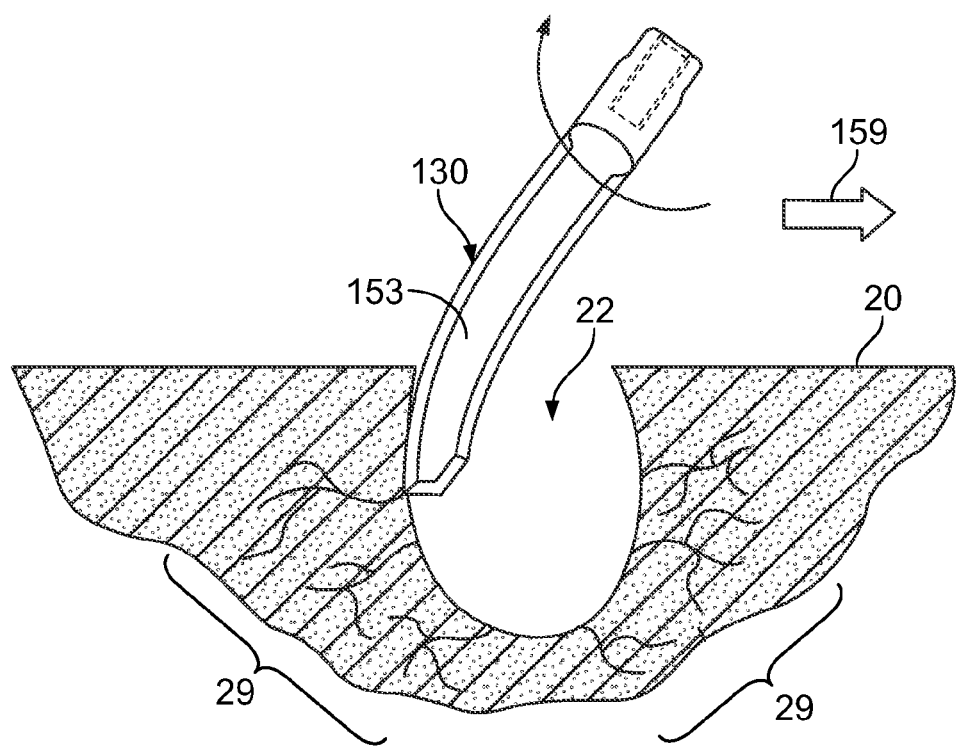

FIGS. 7A-B show an example of the aeration tine 130 penetrating the ground surface 20 and forming an aeration pocket 22. Referring to FIG. 7A, the revolving motion 226 of the tine-holder shafts 132, 134, 140, and 145 (e.g., revolving about the central axis 205) draws the aeration tine 130 to the ground surface 20, and the rotational motion 228 of the tine-holder shaft (e.g., rotation about the individual axis of each shaft 132, 134, 140, and 145) causes the aeration tine 130 to be positioned at an acute angle relative to the ground surface 20 as the tine 130 penetrates the ground surface 20. In this embodiment, the aeration tine 130 has a curved blade portion 153 that may produce a plowshare effect as it initially penetrates the soil. As the aeration tine 130 penetrates the ground surface 20, the forces applied to the tine 130 (e.g., the towing force 159 and other forces transmitted from the tine-holder shafts 132, 134, 140, and 145) along with the angle of entry and the shape of the curved blade portion 153 can create a downward force on the tine 130 similar to that observed by a conventional plowshare as it is forced along the topsoil. This plowshare effect caused by the aeration tine 130 may prevent or reduce undesirable lifting of the aeration apparatus 120 that is commonly associated with conventional aerators. In other embodiments, the timing of the gear system 220 can be adjusted so that the aeration tine 130 penetrates the ground surface 20 with the curved blade portion oriented substantially perpendicular to the ground surface (rather than at the acute angle shown in FIG. 7A).

Referring to FIG. 7B, the aeration tine 130 completes the formation of the aeration pocket 22 as one of the tine-holder shafts 132, 134, 140, and 145, continues its counterclockwise revolving motion 226 and its clockwise rotational motion 228. In this embodiment, a convex cutting edge of the curved blade portion 153 can cut through the soil as the aeration pocket is formed and the tine exits from the ground surface 20. In these embodiments, the aeration tine 130 does not include an aeration tube (common to conventional aeration systems), so no plug is removed from the soil and deposited on the ground surface 20. Rather, the curved blade portion 153 of the aeration tine 130 cuts an aeration groove having a longer dimension in the direction of the cut, which provides a degree of aeration comparable to that provided by conventional end-coring tubes. Also, the movement of the aeration tine 130 in producing the aeration pocket 22 can also serve to fracture the soil, as shown by fracture lines 29. The resulting aeration pockets 22 are visible, but no significant amount of soil (e.g., a soil plug) is deposited on the ground surface 20. Accordingly, the ground surface 20 can be more promptly prepared for use, for example, as a golf course fairway or putting green without the need for additional raking or mowing.

Referring now to FIGS. 8-11, some embodiments of the aeration tine 130 include the curved blade portion 153 having a convex cutting edge 155 and a complementary concave cutting edge 156. As previously described, the aeration tine 130 is capable of forming the aeration pocket 22 without removing a plug of soil. As such, the aeration tine 130 can thus be advantageously implemented to significantly reduce maintenance expenditures, for example, and virtually eliminate golf course downtime caused by aeration procedures.

In this embodiment, the aeration tine 130 includes a mounting portion 131 and the curved blade portion 153. The mounting portion 131 may include a mounting cavity 137 that extends substantially straight along a longitudinal axis. The cavity 137 at the mounting portion 131 is adapted to be received onto a mounting element (not shown) protruding from the tine-holder shafts 132, 134, 140, and 145. For example, the cavity 137 may be equipped with threads, keys, detents, cross-drilled tapped holes for set screws, or other suitable structure that cooperates with the mounting element protruding from the tine-holder shafts 132, 134, 140, and 145. As such, the tines 130 can be securely and releasably mounted to the tine-holder shafts 132, 134, 140, and 145. Releasable mounting configurations advantageously facilitate removal of tines 80 for sharpening or replacement. Also, the mounting portion 131 may include one or more key faces 139 formed in a cylindrical outer surface of the mounting portion 131 which extends coaxially with the longitudinal axis of the mounting cavity 137. The one or more key faces 139 can be substantially flat so as to mate with a wrench or other tool during installation and removal. As shown in FIGS. 9-10, the mounting portion 131 has a width (e.g., the diameter of the cylindrical outer surface) that is substantially greater that the width 162 of the curved blade portion 153.

Still referring to FIGS. 8-11, the curved blade portion 153 of the tine 130 can extend longitudinally from the mounting portion 131 such that the curved blade portion 153 is positioned distal of the mounting cavity 137. The curved blade portion 153 may include opposing parallel side surfaces 157 that define a generally constant width 162 of the curved blade portion 153 along a majority of a longitudinal length of the curved blade portion 153. The curved blade portion 153 may also include a concave blade edge 156 facing laterally away from the opposing parallel side surfaces 157, and a convex blade edge 155 facing laterally away from opposing parallel side surfaces 157 in a direction that is generally opposite from the concave blade edge 155. The convex blade edge 155 and the concave blade edge 156 may converge toward a distal tip portion 154 so that, when the curved blade member is urged in a compound motion through a ground surface, at least one of the convex blade edge 155 and the concave blade edge 156 fractures soil to form the aeration pocket 22 (refer to FIGS. 7A-B).

In this embodiment, the convex blade edge 155 and the concave blade edge 156 are each defined at least in part by opposing transverse surfaces 158a-b. For example, the concave edge 156 is formed between the transverse edges 89a and 89b that generally extend toward one another other. Likewise, the convex edge 155 is formed between the opposing transverse edges that generally extend toward one another other. In particular embodiments, the aeration tine 130 may be made of high strength steel, metal alloys, composites, hard polymeric materials, or other suitable materials.

The width 162 of the curved blade portion 153 can be selected based upon the soil conditions of an area (e.g., an entire golf course, or certain holes or areas of the golf course). For example, the width 162 may be less than ½", about 7/16" or less, about 5/16" or less, and about ⅛" in particular embodiments. The aeration tine 130 depicted in FIGS. 8-11 has the width 162 of approximately ⅛". Moreover, a golf course, for example, can own and operate a small fleet (e.g., 2-5) of ground treatment systems 100, each having an aeration apparatus 120 equipped with different-sized aeration tines 80 (or 130) for use on different areas of the golf course.

Various additional modifications can be advantageously made to the apparatus described above in accordance with the teachings set forth herein. For instance, the concave cutting edge 156 of curved blade portion 153 can be replaced with a blunt surface. Further, in alternative embodiments, the aeration tines 130 can be oriented as shown in FIGS. 7A-B during the formation of the aeration pockets, or they can be rotated 180 degrees about the long axis of the tine. The planetary gear system 220 can be modified to have any desired combination of clockwise and counter-clockwise motions of the planet and sun gears so that, for instance, both the translation and rotation of the blade are in a clockwise direction. The gear ratios and sizes can be modified to create aeration pockets having different profiles and fractures. The tines can be grouped or staggered on the tine holders in any fashion desired. For example, the aeration tines 80 can be grouped in pairs or triplets along the tine holders. The aeration tines 80 can also be disposed at any angle relative to the vertical plane defined by the aeration pockets 22 shown in FIGS. 7A-B to accomplish different types of soil fracturing.

Figure 12:
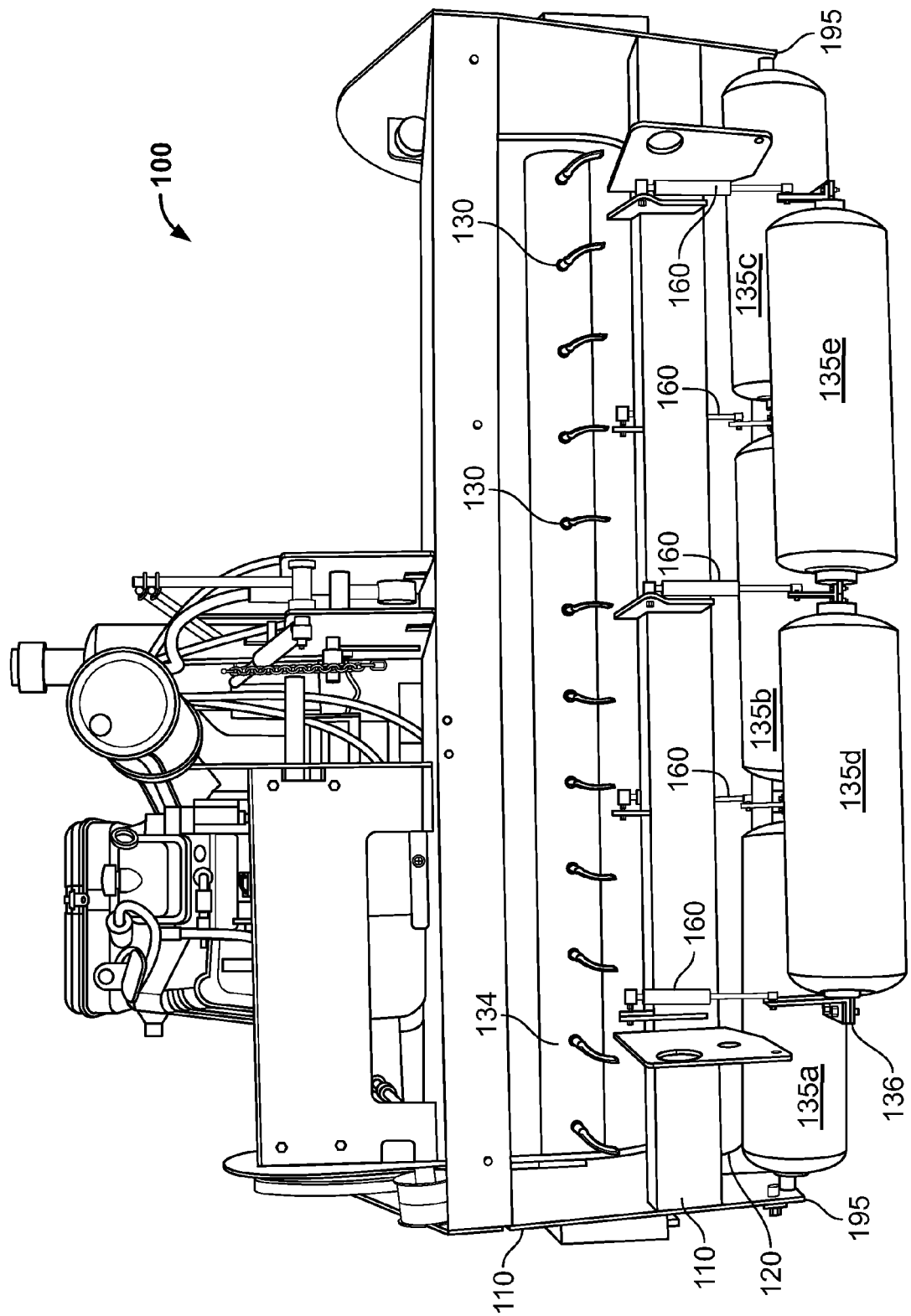
FIG. 12 is a rear view of the ground treatment system.

Referring now to FIGS. 12-13, the flexible roller system 200 of the ground treatment system 100 can be configured to automatically conform to the undulating patterns of the ground surface to thereby provide a smoothing effect in conditions where a single-roller apparatus might otherwise fail. As described in more detail below, the flexible roller system 200 can include one or more rows of the rollers 135 having generally rigid outer cylindrical surfaces, with each row of rollers 135 being mounted on a flexible axle member 136 that flexes along its length in response to one or more of the rollers 135 encountering an undulating ground surface (e.g., a putting green having an undulating surface). As shown in FIG. 12, the rollers 135 can be positioned rearward of the aeration apparatus 120 so that the rollers 135 can pass over the just-treated surface ad provide a smoothing effect thereto. (It should be understood that the wheels 115 are removed from view in FIG. 12 so as to shown the flexible roller system 200). As shown in FIG. 13, which shows the flexible roller system 200 (with the ground treatment system 100 removed from view), the depicted embodiment of the flexible roller system 200 can include two rows of rollers 135, with the rollers 135*a-c* in the forward row, and the rollers 135*d-e* in the rearward row.

The rollers 135*a-c* are attached to the frame 110 by virtue of being rotatably mounted on the flexible axle member 136, which is connected to the frame 110 at its free ends and further connected to the frame 110 using constant force springs 160 positioned along intermediate connection points. The constant force springs 160 can advantageously to force the rollers 135*a-c* mounted on the flexible axle member 136 toward the ground surface 20 such that the rollers 135*a-c* can bear at least a portion of the weight of the system 100 while also flexible adjusting their relative orientation in response to rolling over an undulating ground surface. The rollers 135*d-e* are attached to the frame 110 by virtue of being rotatably mounted on a second (rearward) flexible axle member 136, which is connected to the frame 110 using constant force springs 160 positioned at its free ends and at an intermediate connection point. The second flexible axle member 136 is also connected to the first flexible axle member 136 via flexible connection beams as described in more detail below. Here again, the constant force springs 160 connected to the second flexible axle member 136 can advantageously to force the rollers 135*d-e* toward the ground surface 20 such that the rollers 135*a-c* can bear at least a portion of the weight of the system 100 while also flexible adjusting their relative orientation in response to rolling over an undulating ground surface.

Still referring to FIGS. 12-13, each flexible axle member 136 can comprise a spring steel material and may be formed in the shape of a rectangular beam, which permits the flexible axle member 136 to operate like a leaf spring even when the rollers 135 are rotatably mounted thereto. Each of the rollers 135 include a generally rigid cylindrical roller surface and an inner hollow cavity inside each roller in which the flexible axle member 136 is allowed to bend freely during operation. Thus, as described below in connection with FIGS. 14-15, the flexible axle member 136 may flex to a curved shape in the regions inside the rollers 135 (not necessarily limited to bending in the external regions between adjacent rollers).

As shown in FIG. 13, each one of the constant force springs 160 extends between the frame 110 and its respective flexible axle member 136 so as to provide a downward force that urges the flexible axle member 136 toward the ground surface 20. As described below in connection with FIG. 17, each constant force spring 160 is connected at one end 164 to the flexible axle member 136 (or bearing 138) and connected at the opposing end 162 to the rear side of the frame 110. The constant force spring 160 can provide a downward force between the frame 110 and the flexible axle member 136. Thus, when the flexible roller system encounters an undulating ground surface, one or more of the constant force springs 160 can creating a bending moment on the associated flexible axle member 136 to thereby bending the flexible axle member and temporarily change the relative orientation of the rollers 135 to conform to the undulating ground surface 20. For example, each constant force spring 160 may be a gas spring device having a cylinder head 165 pinned to the top portion of the frame 110 and an actuator arm 163 pinned to the flexible axle member 136 (or bearing 138) at the end 164. During compressions of the constant force spring 160, the actuator arm 163 can slide in and out of the cylinder head 165.

In one example, the constant force springs 160 may be configured to be under generally medium compression when in the position shown in FIG. 1, thus applying a force that allows the rollers 135 to bear at least portion of the weight of the aeration system and to achieve a straight-line position corresponding to the flat surface on which the ground treatment system 100 resides. Moreover, the constant force springs can be configured so that the shared weight of the system 100 that is borne by the rollers 135 is substantially uniformly distributed across each of the rollers 135 as the system is moved over the ground surface. As described below in connection with FIGS. 14-15, some of the constant force springs 160 can adjust away from the frame 110 such that one or more rollers 135 achieve an orientation that allows the flexible roller system 200 to provide a smoothing effect in a valley of an undulating ground surface. Thus, in some circumstances when the rollers 135 pass over an undulating ground surface, the constant force springs may causes the rollers to conform to the ground surface and substantially uniformly bear the weight of the system 100 across each of the rollers 135 in a row. In the embodiments of the flexible roller system 200 described herein, the constant force springs 160 can force the rollers 135 into any undulating surface area 20 having a combination of peaks and valleys.

Referring again to FIG. 13, in some embodiments, the outward ends of the first flexible axle member 136 (carrying the forward row of rollers 135*a-c*) can omit the use of a constant force spring 160. In this case, the flexible axle member 136 can be connected directly to the frame 110, or any extension bar or support extending from the frame 110. The connection can be made, for example, using a locking nut and bolt connection using each of two holes 193 (FIG. 19) in the ends of the flexible axle member 136. These connections can be made at connection points 195 (FIG. 12) on the frame 110, thus positioning the outer ends of the rollers 135*a* and 135*c* at elevations so that the rollers contact the ground surface 20 at generally the same height above the ground as the outer ends of the aeration apparatus 120.

Figure 15:
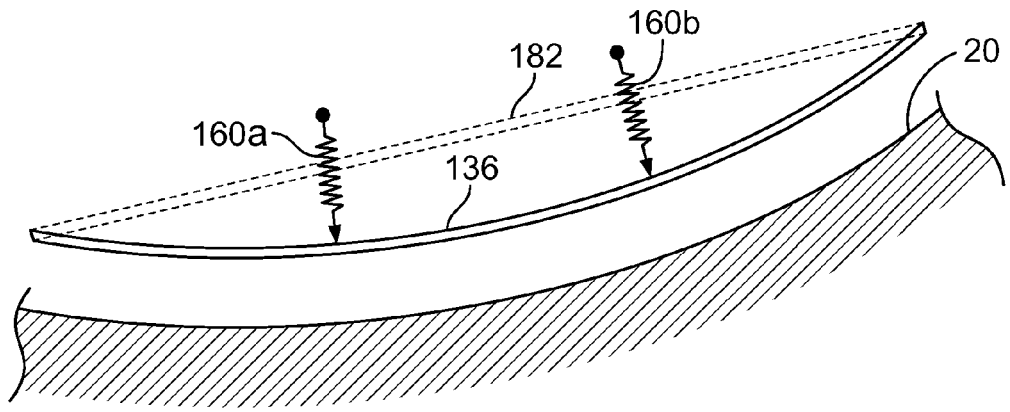
FIG. 15 shows the displacement between the positions of a flexible axle member in a straight position versus a flexed position that conforms to the undulating portion of a ground surface.

Referring now to FIGS. 14-15, each flexible axle member 136 of the flexible roller system 200 may flex to a curved shape in the regions inside the rollers 135 when the rollers 135 pass over an undulating ground surface (e.g., a putting green having undulations). In this particular example, the flexible roller system 200 is depicted as passing over an undulating ground surface having a valley-shaped slope that is commonly found on gold course putting greens. (It should be understood that FIG. 14 illustrate only one row of the rollers 135 so as to better illustrate the operation the constant force springs 160 and the flexible axle member 136.)

As shown in FIG. 14, when the flexible roller system 200 passes over the undulating ground surface, the constant force springs 160a-b apply a bending moment to the flexible axle member 136 such that the flexible axle member 136 flexibly bends along at least a portion of its length. Accordingly, the rollers 135a-c that are rotatably mounted on the flexible axle member 136 are adjusted in orientation so as to conform to the undulating ground surface 20 and thereby maintain contact with the ground surface 20. In particular, the rollers 135a-c are able to maintain contact with the ground surface 20 even in the valley-shaped slope because of the flexible characteristics of the flexible roller system 200.

As shown in FIG. 15, which shows a mechanical diagram of the bending moment applied to the flexible axle member of FIG. 14, the constant force springs 160a-b can cause the flexible axle member to bend to a condition that more closely matches the undulation of the ground surface 20 as compared to a straight rigid axle 182 (shown in dotted lines). When the flexible axle member 136 is flexed to the generally curved shape, the rollers 135 a-c that are rotatably mounted thereto are likewise adjust in orientation so as to more closely conform to the undulation of the ground surface 20. Moreover, because the constant force springs 160a-b can cause the weight of the system 100 be to more uniformly distributed across the flexible axle member 136, the weight of the system 100 that is borne by the rollers 135a-c may also be substantially uniformly distributed even when the roller system 200 passes over the undulating ground surface 20.

Referring again to FIGS. 14-15, the flexible axle member 136 can be configured to flexibly bend along the portions of the axle 136 inside the hollow cavity of each roller 135. For example, as illustrated in FIG. 14, the flexible axle member 136 is shown to have a bend (caused by flexing) that is approximately centered at a point 141a that is about halfway along the length of the flexible axle member 136 (and inside the middle of the center roller 135b). The flexing occurs because the constant force springs 160a and 160b are pushing down on the flexible axle member 136 at points 141b and 141c, respectively. The constant force spring 160b is attached to the flexible axle member 136 at point 141c that is between the bearings 138c and 138d. In this case, the bearing 138c supports the right side of the roller 135b, while the bearing 138d supports the left side of the roller 135c. The tops 162 of the constant force springs 160a-b are attached to the frame 110, such as by fixed connection or some kind of hinged connection. As described in more detail below in connection with FIGS. 18-19, the flexible axle member 136 can be connected with the bearings 138 using a set of discs 199 (FIG. 19) slidably positioned over the rectangular beam of the flexible axle member 136 to thereby provide a degree of movement during flexing of the flexible axle member 136. Thus, during operation of the flexible roller system 200, the bearings 138 can supporting their perspective rollers 135 in connection with the flexible axle member 136 even while the flexible axle member is permitted to flex inside the hollow cavity of one or more rollers 135.

Figures 16A, 16B:
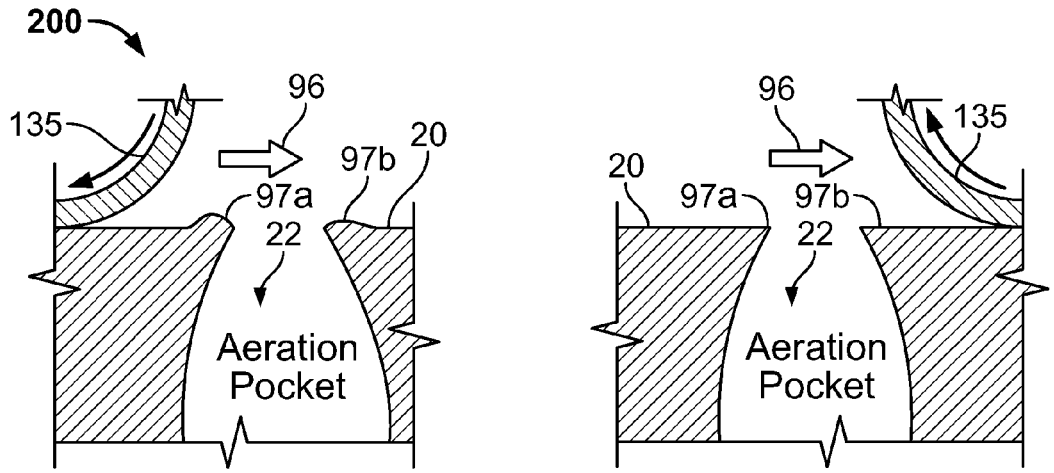
FIGS. 16A and 16B show the flexible roller system in operation during smoothing of the ground surface.

Referring to FIGS. 16A and 16B, the flexible roller system 200 is shown in action as it smoothes the ground surface 20 that was treated the formation of an aeration pocket 22. In FIG. 16A, one roller 135 of the flexible roller system 200 is shown rolling across the ground surface 20 toward the aeration pocket 22, as shown by direction of movement arrow 96. As shown in FIG. 16B, the roller 135 can provide a smoothing effect to the top of the aeration pocket 22. For example, as the result of an aeration tine 130 penetrating and exiting the ground surface during the formation of the aeration pocket 22 (FIGS. 7A-B), slightly elevated ridges 97a and 97b can be formed at the top opening of the aeration pocket 22. These ridges 97a-b may be unnoticeable in instances, except, for example, on putting green surfaces where a highly smooth ground surface is desired.

Referring to FIG. 16B, as the flexible roller system 200 passes over the ground surface 20 and the roller 135 engages the ridges 97a-b, the roller 135 can provide a smoothing effect to the top opening of the aeration pocket 22. As a result, the ridges 97a and 97b are shown in a smoothed smooth condition that permits the putting green or other ground surface 20 to be immediately ready for use after a single pass of the ground treatment system 100. Thus, the flexible characteristics of the flexible roller system 200 enable the rollers 135 to provide a smoothing effect to the ground surface even when the roller system 200 moves over undulating terrain.

Figure 18:
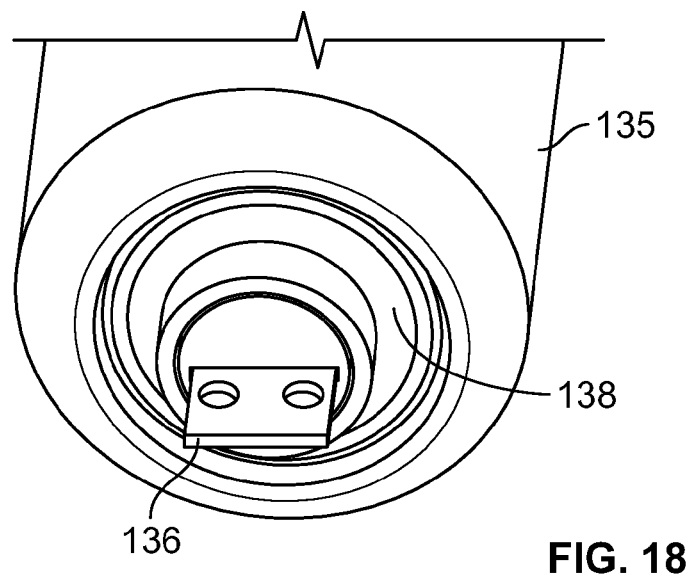
FIGS. 18-19 are views of the flexible axle member.
Figure 19:
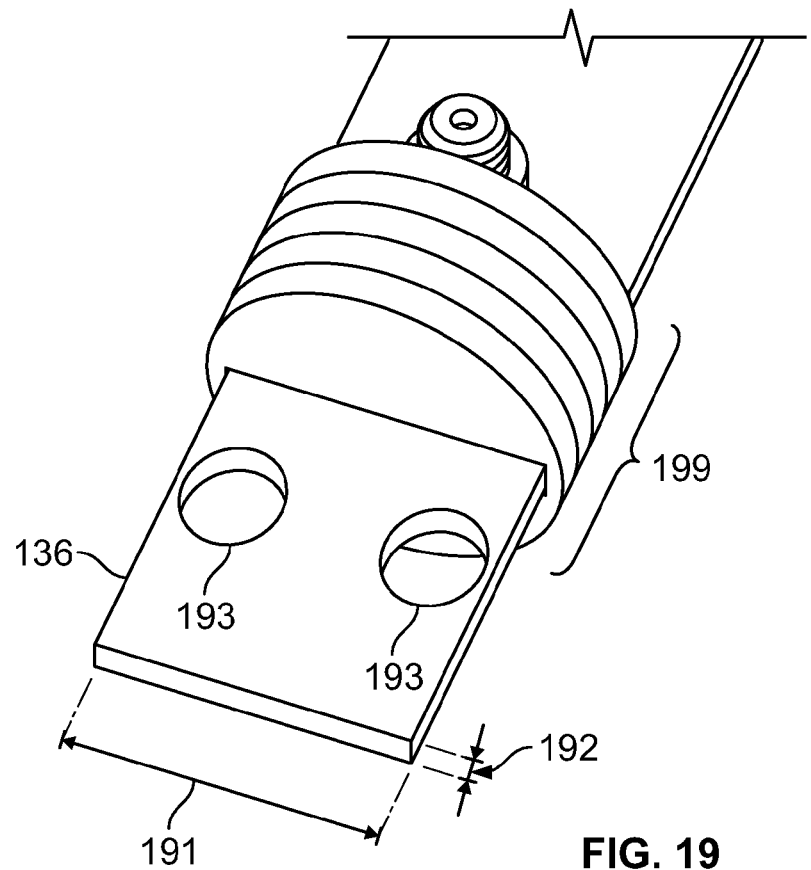

Referring now to FIGS. 17-19, the flexible roller system 200 can include an apparatus for rotatably mounting the rollers 135 to the flexible axle member 136 in a manner that permits temporary bending along substantially the entire length of the flexible axle member 136. For example, bearings 138 arranged at opposing ends of each roller 135 can provide support for each roller 135 to rotate relative to the flexible axle 136. In the embodiment of the flexible roller system 200 shown in the exploded view of FIG. 17, a row of rollers 135 is assembled in a side-by-side arrangement onto the flexible axle member 136. FIG. 18 shows the end of the flexible axle member 136 with the end bearing 138b attached. FIG. 19 shows the end of the flexible axle member 136 without the end bearing 138b attached. The dimensions of the flexible axle member 136 can be selected to provide the desired flexibility while also permitting the rollers to bear the weight of the system 100. For example, as shown in FIG. 19, the flexible axle member 136 can have an axle width 191 of about 1.0 inch or more (about 1.25 inches in this embodiment) and an axle thickness 192 of about 0.25 inches or less (preferably about 0.135 inches in this embodiment). In some embodiments, a thinner axle thickness 192 can be used for a shorter flexible axle member 136 (e.g., holding just two rollers 135d-e) in order to achieve comparable flexibility of flexible roller axles 136 that house a greater number of rollers 135 (e.g., three rollers 135a-c). Some embodiments of the flexible axle member 136 can have varying thicknesses 192 along the length of the flexible axle member 136 in order to achieve improved flexing, which can improve the ability of a set of rollers 135 to conform to the varying slopes of the undulating portion of the ground surface 20.

Referring again to FIG. 17, some embodiments of the flexible roller system 200 include a flexible connecting member 236 that joins the first flexible axle member 136 with the second (rearward) the flexible axle member 136. The flexible connecting member 236 can also comprise a spring steel material, and can have dimensions (e.g., thickness and width) and properties similar to the flexible axle member 136. The flexible connecting member 236 can be fixedly connected to the flexible axle members 136 with nut and bolt connections 133 as shown I FIG. 17.

As shown in FIGS. 17 and 19, the flexible roller system 200 can employ a dynamic connector 199 between each roller 135 and the flexible axle member 136 so as to provide the flexible axle member 136 with clearance to bend along the regions inside the roller 135. The dynamic connector 199 provides the transition between the generally rectangular beam shape of the flexible axle member 136 and the generally cylindrical shape of the inner race of the bearing 138.

In addition, the dynamic connector 199 can be configured to provide the flexible axle member 136 with the ability to move slightly relative to the inner race of the bearing 138 so that the flexible axle member 136 can be flexed along its length including the regions inside the roller 135. However, the dynamic connector 199 can retain the bearing 138 (and thus the roller 135) in a generally stationary longitudinal position along the length of flexible axle member 136. In this embodiment, the dynamic connector 199 comprises a stacked group of flat metal disks, each having a slot that slidably fits over the flexible axle member 136. The stacked group of disks is retained in a longitudinal position on the flexible axle member by a mounting nut on each side of the stack. During operation of the flexible roller system 200, as the flexible axle member 136 flexes up and down to match the undulating ground surface 20, the flat metal disks 199 within the flexible cylindrical member 199 permit the flexible axle member to move slightly relative to the inner race of the bearing 138 while still maintaining the bearing in its axial position. The disks 199 can be slightly tilted depending upon the flexed condition of the flexible axle member 136 so as to form different angles of a generally cylindrical shape. The inner race of each of the bearings 138 fits over the dynamic connector 199, allowing the flexible axle member 136 to flex from end-to-end in some circumstances.

Accordingly, the flexible roller system 200 in this embodiment is arranged rearward of the aeration apparatus 120 such that the rollers 135 of the flexible roller system 200 contact and smooth the ground surface after it is treated by the plurality of aeration tines 130. The overall system 100 can provide aeration and smoothing in a single pass even in circumstances when the ground surface includes undulations, thereby treating the ground surface in a more efficient and economical manner.

In some alternative embodiments, the flexible roller system 200 may include a several rows of rollers 135 of different sizes. For example, a first (or most forward) set of rollers 135 may have a large diameter (e.g., 7 inches), followed by rows of rollers 135 of increasingly smaller diameters (e.g., 5 inches, 3 inches, 1 inch). In such embodiments, the flexible roller system can apply an increased progression of pressure on the ground surface with each row of rollers 135.

In another alternative embodiment of the ground treatment system 100, the system may include the flexible roller system 200 coupled to the frame 110 without any aeration apparatus coupled thereto. In such circumstances, the flexible roller system 200 can be towed behind the vehicle by itself so to provide a smoothing effect to a ground surface 20, for example a ground surface that was previously treated by other equipment.

A number of embodiments of the invention have been described. Nevertheless, it will be understood that various modifications may be made without departing from the spirit and scope of the invention. Accordingly, other embodiments are within the scope of the following claims.

What is claimed is:

1. A system for treating a ground surface, comprising:
a frame for transporting over a ground surface;
an aeration apparatus coupled to the frame, the aeration apparatus comprising a plurality of aeration tines that form aeration pockets in the ground surface when driven to penetrate the ground surface; and
a flexible roller system coupled to the frame and including
a first roller having a first generally rigid cylindrical surface, a second roller having a second generally cylindrical surface, a flexible axle member extending through the first and second rollers such that the first roller is positioned proximate the second roller,
a first constant force spring having a first end connected to the frame and a second end connected to the flexible axle member proximate a first free end of the flexible axle member, a second constant force spring having a third end connected to the frame and a fourth end connected to the flexible axle member proximate a second free end of the flexible axle member, and an intermediate constant force spring having a fifth end connected to the frame and a sixth end connected to the flexible axle member at a position intermediate the first and second rollers.

2. The system of claim 1, wherein the aeration apparatus is configured to form elevated ridges at top openings of the aeration pockets formed in the ground surface by the aeration tines, wherein the first and second rollers are positioned behind the aeration tines, and wherein the first, second, and intermediate constant force springs are positioned and configured to produce downward forces on the flexible axle member sufficient to cause the first and second rollers to smooth the elevated ridges of the top openings of the aeration pockets on undulating terrain.

3. The system of claim 1, wherein the first and second rollers are slidably connected to the flexible axle member via a plurality of bearings.

4. The system of claim 1, wherein the first and second rollers are connected to the flexible axle member via a plurality of bearings and discs that allow for flexing of the flexible axle member inside first and second hollow cavities of the first and second rollers.

5. The system of claim 4, wherein discs permit the flexible axle member to move relative to inner races of the bearings while still maintaining the bearings in their respective axial positions.

6. The system of claim 1, wherein the flexible roller system further comprises a third roller having a third generally rigid cylindrical surface, a fourth roller having a fourth generally cylindrical surface, and a second flexible axle member extending through the third and fourth rollers such that the third roller is positioned proximate the fourth roller.

7. A system for treating a ground surface, comprising:
a frame for transporting over a ground surface;
a soil treatment apparatus coupled to the frame such that the soil treatment apparatus penetrates the ground surface when the frame is transported over the ground surface; and
a flexible roller system coupled to the frame and including:
a first roller having a first generally cylindrical surface extending between first and second roller ends;
a second roller having a second generally cylindrical surface extending between third and fourth roller ends;
a flexible axle member extending through the first and second rollers such that the second roller end is positioned proximate the third roller end;
a first constant force spring having a first end connected to the frame and a second end connected to the flexible axle member proximate the first roller end; and a second constant force spring having a third end connected to the frame and fourth end connected to the flexible axle member proximate both of the second and third roller ends.

8. The system of claim 7, wherein the soil treatment apparatus is configured to form aeration pockets having top openings with elevated ridges, wherein the flexible roller system is position behind the soil treatment apparatus, and wherein the first, second, and third constant force springs are positioned and configured to produce downward forces on the flexible axle member sufficient to cause the first and second rollers to smooth the elevated ridges of the top openings of the aeration pockets on undulating terrain.

9. The system of claim 7, wherein the flexible roller system further comprises a third constant force spring connecting the frame to the flexible axle member proximate the fourth roller end.

10. The system of claim 7, wherein the first and second rollers are slidably connected to the flexible axle member via a plurality of bearings.

11. The system of claim 10, wherein the plurality of bearings comprises a first bearing connected between the first roller end and the flexible axle member, a second bearing connected between the second roller end and the flexible axle member, a third bearing connected between the third roller end and the flexible axle member, and a fourth bearing connected between the fourth roller end and the flexible axle member, and wherein the first, second, third, and fourth bearings are connected so as to permit the flexible axle member to move relative to inner races of the first, second, third, and fourth bearings while still maintaining the first, second, third, and fourth bearings in their respective axial positions.

12. The system of claim 7, wherein the first and second rollers are connected to the flexible axle member via a plurality of bearings and discs that allow for flexing of the flexible axle member inside first and second hollow cavities of the first and second rollers.

* * * * *